(12) United States Patent
Miyazaki

(10) Patent No.: US 8,569,431 B2
(45) Date of Patent: Oct. 29, 2013

(54) TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 538 days.

(21) Appl. No.: 12/502,489

(22) Filed: Jul. 14, 2009

(65) Prior Publication Data

US 2010/0024947 A1 Feb. 4, 2010

(30) Foreign Application Priority Data

Aug. 1, 2008 (JP) ................................. 2008-199897

(51) Int. Cl.
- C08G 8/28 (2006.01)
- C08G 75/00 (2006.01)
- C08G 73/02 (2006.01)
- C08F 283/00 (2006.01)
- B60C 1/00 (2006.01)

(52) U.S. Cl.
USPC ........... 525/504; 525/505; 525/535; 525/540; 152/537

(58) Field of Classification Search
USPC .................. 152/537; 525/504, 505, 535, 540
See application file for complete search history.

(56) References Cited

U.S. PATENT DOCUMENTS

| | | | |
|---|---|---|---|
| 3,469,614 A * | 9/1969 | Kobayasi | 152/532 |
| 3,873,489 A * | 3/1975 | Thurn et al. | 524/262 |
| 5,879,483 A * | 3/1999 | Gerresheim et al. | 152/209.5 |
| 6,148,889 A * | 11/2000 | Minami et al. | 152/510 |
| 6,265,490 B1 * | 7/2001 | Morel-Fourrier et al. | 525/149 |
| 6,305,451 B1 * | 10/2001 | Ueyoko | 152/531 |
| 7,902,289 B2 * | 3/2011 | Miyazaki | 524/575.5 |
| 2003/0060551 A1 * | 3/2003 | Mizuno et al. | 524/418 |
| 2005/0192386 A1 * | 9/2005 | Miyazaki | 524/100 |
| 2006/0102269 A1 * | 5/2006 | Uchida et al. | 152/532 |
| 2006/0229396 A1 * | 10/2006 | Mizuno et al. | 524/398 |
| 2007/0093580 A1 | 4/2007 | Mizuno | |
| 2007/0232737 A1 | 10/2007 | Miyazaki | |
| 2007/0272338 A1 | 11/2007 | Galimberti et al. | |

FOREIGN PATENT DOCUMENTS

| | | |
|---|---|---|
| CN | 1660948 A | 8/2005 |
| CN | 1775835 A | 5/2006 |
| CN | 1882442 A | 12/2006 |

(Continued)

OTHER PUBLICATIONS

Hankook Tyre Information, 2007.*

*Primary Examiner* — William Cheung
(74) *Attorney, Agent, or Firm* — Birch, Stewart, Kolasch & Birch, LLP

(57) ABSTRACT

A tire having a strip layer between breaker and ply using a rubber composition for a strip layer between breaker and ply capable of improving tensile strength at break and elongation at break, capable of also lessening the lowering rate of fracture property after thermal aging, and also being excellent in separation resistance property is provided. A tire having a strip layer between breaker and ply using a rubber composition for a strip layer between breaker and ply comprising (A) 2.0 to 3.9 parts by mass of sulfur, (B) 0.5 to 4 parts by mass of a cresol resin, a modified cresol resin, resorcinol or a modified resorcinol condensate and (C) 0.3 to 3 parts by mass of a partial condensate of hexamethylolmelaminepentamethylether or a partial condensate of hexamethoxymethylolmelamine, based on 100 parts by mass of a diene rubber component, wherein the thickness of the strip layer between breaker and ply is 0.3 to 3.9 mm.

3 Claims, 2 Drawing Sheets

(56) References Cited

FOREIGN PATENT DOCUMENTS

| | | |
|---|---|---|
| CN | 1951991 A | 4/2007 |
| CN | 101045840 A | 10/2007 |
| EP | 1 568 735 A1 | 8/2005 |
| JP | 2000-71716 A | 3/2000 |
| JP | 2005-239874 A | 9/2005 |
| JP | 2005-272815 A | 10/2005 |
| JP | 2006-232895 A | 9/2006 |
| JP | 2007-112944 A | 5/2007 |

* cited by examiner

TIRE

This U.S. patent application claims benefits of Japan Patent Application No. 2008-199897 filed Aug. 1, 2008.

BACKGROUND OF THE INVENTION

The present invention relates to a tire having a strip layer between breaker and ply using a rubber composition for a strip layer between breaker and ply.

Fracture and separation from fine cracks in rubber between breaker and ply is occasionally generated in a radial tire for heavy duty when requisites of throughway running and high temperature area are duplicated.

The origination of the fine cracks is occasionally foreign articles in NR or during process and occasionally minerals in an antioxidant or zinc oxide badly dispersed.

It is effective for the problem to physically paste a strip rubber between breaker and ply to mitigate the concentration of strain, and methods of extending breaker cushion and additionally pasting the same compounding are generally carried out.

However, although a cushion rubber has low heat build-up property, reinforcing property and tensile strength at break is not adequate. Accordingly, a rubber having the same compounding as a breaker topping rubber by which adequate effect in reinforcing property and tensile strength at break is obtained is used as a strip rubber.

By the way, although a rubber composition used as for breaker topping is disclosed in the patent literature 1, it has not been known that the rubber composition of the patent literature 1 is applied as the strip rubber.

[Patent literature 1] Japanese Unexamined Patent Publication No. 2005-239874

SUMMARY OF THE INVENTION

It is the purpose of the present invention to provide a tire having a strip layer between breaker and ply using a rubber composition for a strip layer between breaker and ply capable of improving tensile strength at break and elongation at break, capable of also lessening the lowering rate of fracture property after thermal aging, and also being excellent in separation resistance property.

The present invention relates to a tire having a strip layer between breaker and ply using a rubber composition for a strip layer between breaker and ply comprising (A) 2.0 to 3.9 parts by mass of sulfur, (B) 0.5 to 4 parts by mass of a cresol resin, a modified cresol resin, resorcinol or a modified resorcinol condensate, and (C) 0.3 to 3 parts by mass of a partial condensate of hexamethylolmelaminepentamethylether or a partial condensate of hexamethoxymethylolmelamine, based on 100 parts by mass of a diene rubber component, wherein the thickness of the strip layer between breaker and ply is 0.3 to 3.9 mm.

Further, the content of (D) cobalt is preferably 0.05 to 0.8 parts by mass based on 100 parts by mass of the rubber component.

DESCRIPTION OF CODES

1 Tread
2 Sidewall
3 Carcass ply
4 Breaker
5 Inner liner
6,7 Strip layer between breaker and ply The strip layer between breaker and ply in the tire of the present invention is illustrated below with reference to drawings.

Figure 1:
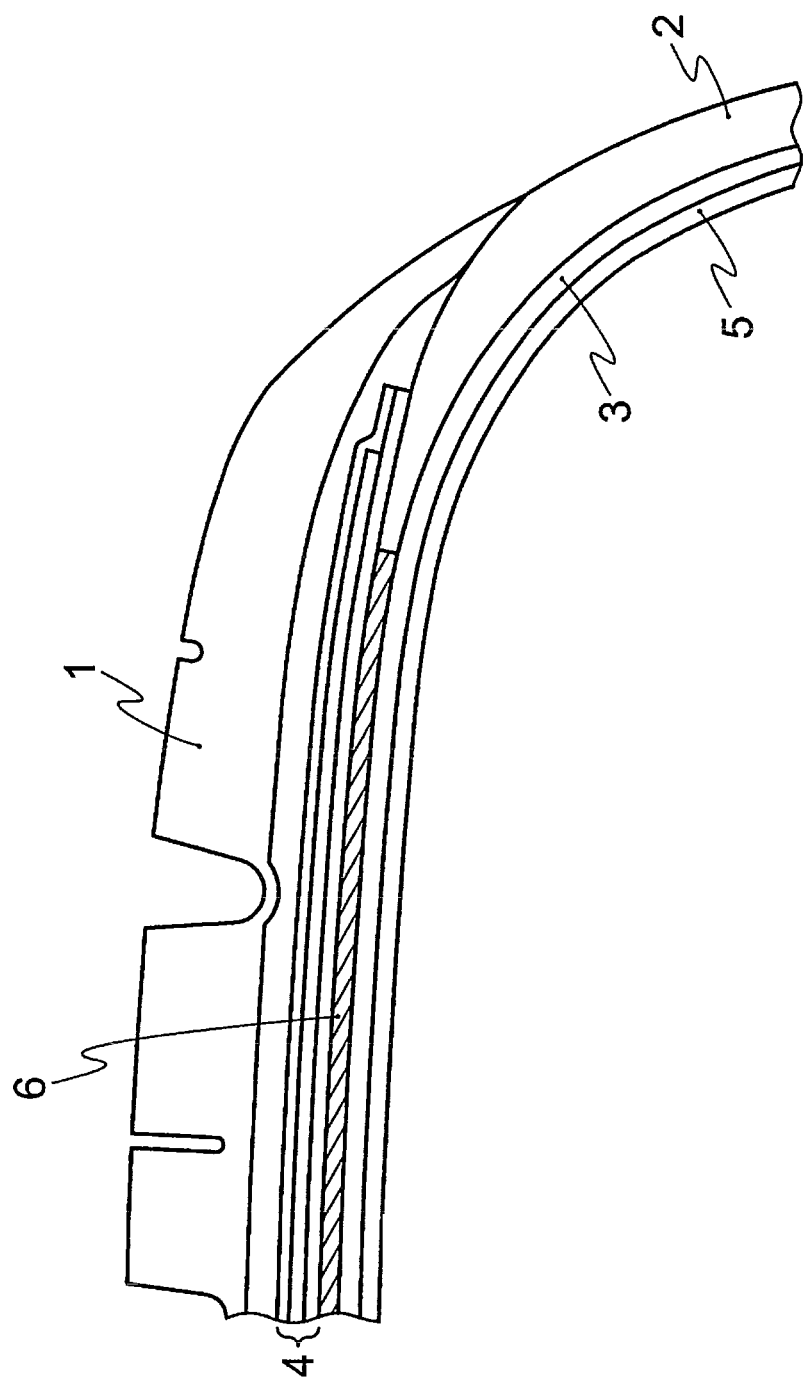
FIG. 1 is the partial sectional view of the tire showing a structure having a strip layer between breaker and ply using the rubber composition for a strip layer between breaker and ply of the present invention.

FIG. 1 is a partial sectional view of a tire showing a structure having a strip layer between breaker and ply using the rubber composition for a strip layer between breaker and ply. Herein, as shown in FIG. 1 that is the partial sectional view of a tire having a strip layer between breaker and ply, the strip layer 6 between breaker and ply is a rubber layer provided at the inside of a breaker 4 at the outside of a carcass ply 3, in a tire having a tread 1, a sidewall 2, the carcass ply 3 provided at the inside of the tread 1 and sidewall 2, the breaker 4 provided at the outside of the carcass ply 3 at the inside of the tread 1 and an inner liner 5 provided at the inside of the carcass ply 3, and it can improve separation resistance performance without enlarging the thicknesses of the breaker and carcass ply. The maximum value of the width of the strip layer 6 between breaker and ply may be the same width as the breaker 4.

Figure 2:
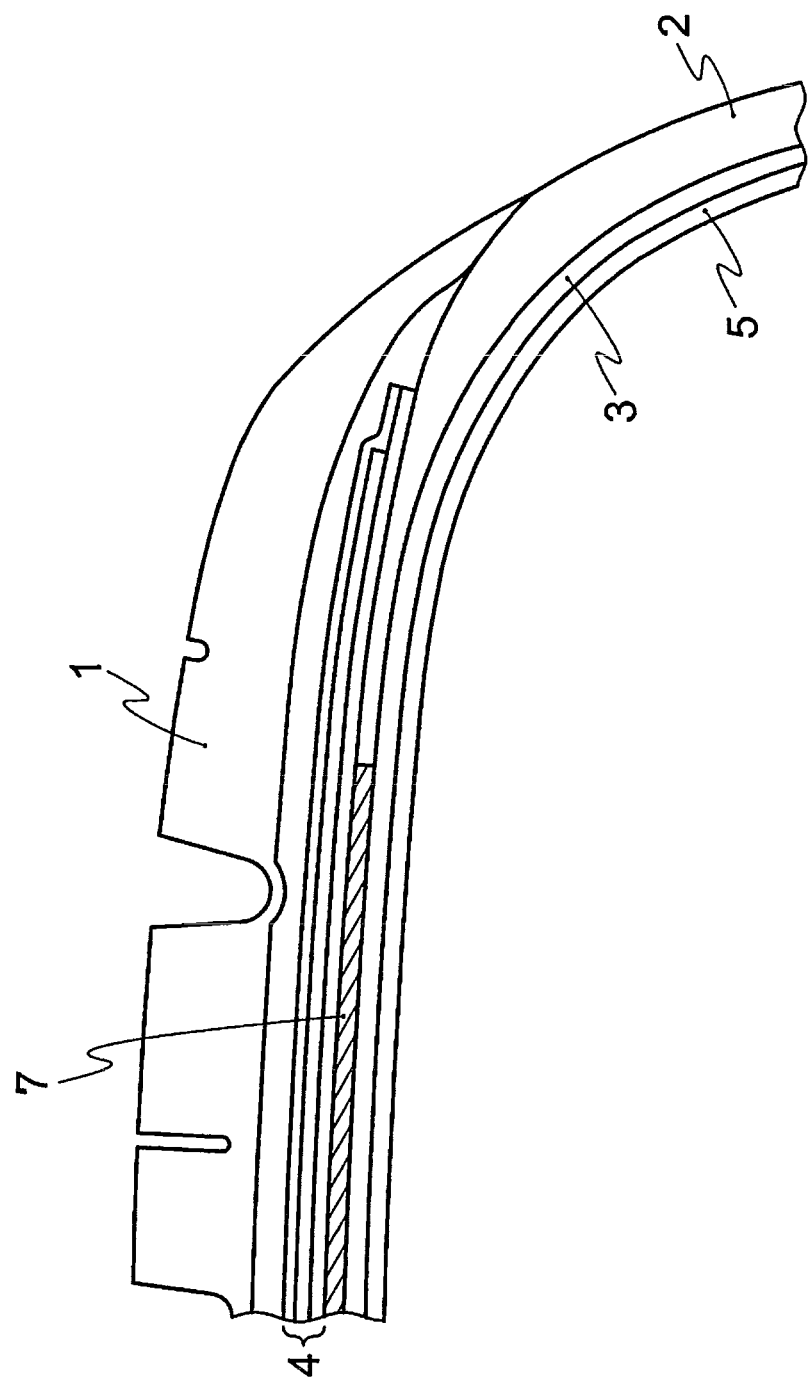
FIG. 2 is the partial sectional view of the tire showing a structure having a strip layer between breaker and ply using the rubber composition for a strip layer between breaker and ply of the present invention.

FIG. 2 is a partial sectional view of a tire showing a structure having a strip layer between breaker and ply using the rubber composition for a strip layer between breaker and ply. In FIG. 2, the width of a strip layer 7 between breaker and ply is a range covering the groove of the tire tread. In FIG. 2, the tread 1, the sidewall 2, the carcass ply 3, the breaker 4 and the inner liner 5 are same as FIG. 1.

DETAILED DESCRIPTION

The tire of the present invention has a strip layer between breaker and ply.

The rubber composition for a strip layer between breaker and ply includes a diene rubber component, (A) sulfur, (B) a cresol resin, a modified cresol resin, resorcinol or a modified resorcinol condensate and (C) the partial condensate of hexamethylolmelaminepentamethylether or the partial condensate of hexamethoxymethylolmelamine.

The diene rubber component is not specifically limited and includes rubbers such as diene rubbers such as a natural rubber (NR), a styrene-butadiene rubber (SBR) and a butadiene rubber (BR) and butyl rubbers such as a butyl rubber, which are generally used in the rubber industry. Among them, NR is preferably used because the cis structure of polyisoprene is nearly 100% and tensile strength is very superior in comparison with other rubber components. One kind or at least two kinds of the fore-mentioned rubber components can be used in combination.

When BR is used in the diene rubber component, a butadiene rubber with high cis content (high cis BR) is preferable because it is superior in crack growth property. Herein, the high cis BR means BR in which the content of cis 1,4-bond for the butadiene portion of a rubber obtained is at least 90%.

The high cis BR used in the present invention can use a commercially available high cis BR and, for example, high cis BR's such as BR130B and BR150B manufactured by Ube Industries can be preferably used.

As (A) sulfur, insoluble sulfur generally used in the rubber industry can be preferably used.

The content of (A) sulfur is at least 2.0 parts by mass based on the diene rubber component, preferably at least 2.5 parts by mass and more preferably at least 2.9 parts by mass because hardness (Hs) is improved and good. Further, the content of sulfur is at most 3.9 parts by mass based on 100 parts by mass of the diene rubber component, preferably at most 3.7 parts by mass and more preferably 3.5 parts by mass because tensile strength at break is superior. Further, when insoluble sulfur is used as (A) sulfur, the content of sulfur indicates the content of pure sulfur content excluding oil content.

The rubber composition used for a strip layer between breaker and ply includes (B) a cresol resin, a modified cresol resin, resorcinol or a modified resorcinol condensate.

The resorcinol resin means a compound represented by the formula (1).

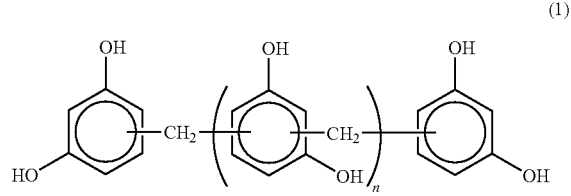

(1)

The modified resorcinol condensate means a condensate in which a resorcinol condensate is alkylated as in the formula (2). Wherein n is an integer. Examples of the modified resorcinol condensate include those such as SUMIKANOL 620 manufactured by Sumitomo Chemical Co., Ltd.), Penacolite Resin as a resorcinol-formalin reaction product (1319S manufactured by INDSPEC Chemical Corporation) and RSM (a mixture of about 60% by mass and about 40% by mass of stearic acid). Among them, Sumikanol 620 is preferable because aging change and stability caused by moisture absorption are superior.

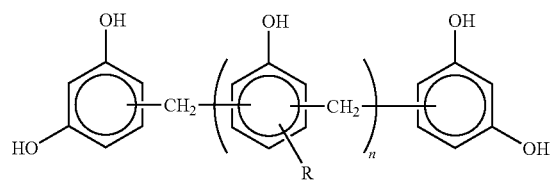

(2)

The cresol resin means a compound represented by the formula (3). Wherein n is an integer of at least 1.

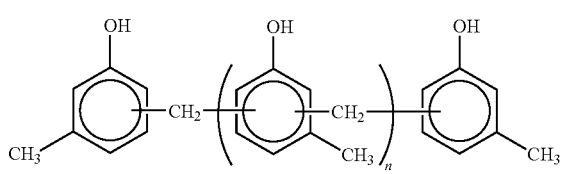

(3)

The cresol resin is solid at normal temperature because its chemical softening point is around 100° C. (92 to 107° C.), but a metacresol resin is most preferable because it is easily dispersed because of being liquid at rubber kneading and further because reaction initiating temperature with the partial condensate of hexamethylolmelaminepentamethylether (HMMPME) used in the present invention is around 130° C. and suitably at most at the temperature of tire vulcanization (145 to 190° C.).

The modified cresol resin includes a resin in which the methyl group of the terminal of a cresol resin is modified to a hydroxyl group and a resin in which the portion of repeating units of a cresol resin is alkylated.

The content of (B) a cresol resin, a modified cresol resin, resorcinol or a modified resorcinol condensate is at least 0.5 parts by mass, based on 100 parts by mass of the diene rubber component, preferably at least 0.7 parts by mass and more preferably at least 1.0 part by mass because tensile strength at break and hardness are superior. Further, the content of a resorcinol condensate, a modified resorcinol condensate, a cresol resin or a modified cresol resin is at most 4 parts by mass, based on 100 parts by mass of the diene rubber component, preferably at most 3 parts by mass and more preferably 2 parts by mass because tensile strength at break and tan δ (heat build-up property) are superior. The peak of the tensile strength at break is situated where the content of (B) a cresol resin, a modified cresol resin, resorcinol or a modified resorcinol condensate is 1.0 to 2.0 parts by mass.

The rubber composition used for a strip layer between breaker and ply includes (C) the partial condensate of hexamethylolmelaminepentamethylether (HMMPME) or the partial condensate of hexamethoxymethylolmelamine (HMMM). The partial condensate of HMMPME means those represented by the formula (4). Further, the partial condensate of HMMM means those represented by the formula (5).

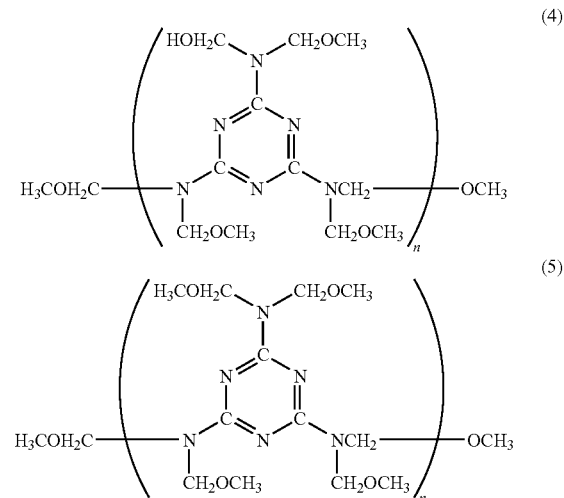

In the formulae (4) and (5), n is an integer of 1 to 3.

The content of (C) the partial condensate of HMMPME or the partial condensate of HMMM is at least 0.3 parts by mass, based on 100 parts by mass of the rubber component, preferably at least 0.5 parts by mass and more preferably at least 0.7 parts by mass because adequate hardness is obtained and tensile strength at break is superior. Further, the content of (C) the partial condensate of HMMPME or the partial condensate of HMMM is at most 3 parts by mass, based on 100 parts by mass of the rubber component, preferably at most 2.5 parts by mass and more preferably at most 2.0 parts by mass from the viewpoints of improving low heat build-up property and being superior in tensile strength at break.

The rubber composition used for a strip layer between breaker and ply may include (D) cobalt salt of organic acid from the viewpoints of capable of sharing compounding as breaker topping (for coating steel cord) and capable of improving the long-term adhesion property of a ply topping rubber and a ply cord.

Specific example of (D) the cobalt salt of organic acid includes, for example, cobalt stearate, cobalt naphthenate and cobalt neodecanate.

The content of (D) the cobalt salt of organic acid is preferably at least 0.05 parts by mass converted to cobalt, based on 100 parts by mass of the rubber component, more preferably at least 0.07 parts by mass and further preferably at least 0.09 parts by mass. Further, the content of (D) the cobalt salt of organic acid is preferably at most 0.8 parts by mass converted to cobalt, based on 100 parts by mass of the rubber component, more preferably at most 0.6 parts by mass and further preferably 0.4 parts by mass.

The rubber composition used for a strip layer between breaker and ply can also suitably compound carbon black, a reinforcing agent such as silica, zinc oxide, an antioxidant and a vulcanization accelerator in addition to the rubber component, (A) sulfur, (B) a cresol resin, a modified cresol resin, a resorcinol condensate or a modified resorcinol condensate, (C) the partial condensate of hexamethylolmelaminepentamethylether or the partial condensate of hexamethoxymethylolmelamine and (D) the cobalt salt of organic acid.

When carbon black is compounded as a reinforcing agent, the content of carbon black is preferably at least 40 parts by mass, based on the diene rubber component, more preferably at least 45 parts by mass and further preferably at least 50 parts by mass because it is superior in reinforcing property and hardness. Further, the content of carbon black is preferably at most 80 parts by mass, based on 100 parts by mass of the diene rubber component, more preferably at most 75 parts by mass and further preferably at most 70 parts by mass because heat build-up property and elongation at break are superior.

The nitrogen adsorption specific surface area ($N_2SA$) of carbon black is preferably 60 to 130 $m^2/g$, more preferably 65 to 120 $m^2/g$ and further preferably 70 to 110 $m^2/g$. When $N_2SA$ is less than 60 $m^2/g$, reinforcing property tends to be low and the growth of separation tends to be fast, and when the $N_2SA$ exceeds 130 $m^2/g$, heat build-up tends to be heightened and separation tends to grow easily.

When silica is compounded as a reinforcing agent, the content of silica is preferably at least 5 parts by mass, based on 100 parts by mass of the diene rubber component, more preferably at least 7 parts by mass and further preferably at least 9 parts by mass because elongation at break is superior. Further, the content of silica is preferably at most 30 parts by mass, based on 100 parts by mass of the diene rubber component, more preferably at most 25 parts by mass and further preferably 20 parts by mass because hardness is superior.

The nitrogen adsorption specific surface area ($N_2SA$) of silica is preferably 30 to 250 $m^2/g$, more preferably 60 to 210 $m^2/g$ and further preferably 100 to 190 $m^2/g$. When $N_2SA$ is less than 30 $m^2/g$, elongation at break tends to be low, and when the $N_2SA$ exceeds 250 $m^2/g$, heat build-up tends to be deteriorated and dispersion tends to be difficult (the possibility of deterioration of elongation at break).

The antioxidant includes those such as phenylenediamine and those such as phenylenediamine are preferably used from the viewpoint of effectively preventing the oxidation deterioration of a polymer.

The content of the antioxidant is preferably at least 1 part by mass, based on the rubber component, and more preferably at least 1.5 parts by mass. When the content is less than 1 part by mass, the oxidation deterioration of a polymer tends to be unable to be suppressed. Further, the content is preferably at most 5 parts by mass and more preferably at most 4 parts by mass. When the content exceeds 5 parts by mass, heat build-up property tends to be deteriorated.

The rubber composition used for a strip layer between breaker and ply includes further zinc oxide.

Zinc oxide is not specifically limited and zinc oxides such as ZINC OXIDE No. 1 and ZINC OXIDE No. 2 available from Mitsui Mining And Smelting Company, Limited.

The content of zinc oxide is preferably 5 to 30 parts by mass, based on 100 parts by mass of the rubber component, and more preferably 7 to 12 parts by mass because deterioration resistance is superior.

Further, the rubber composition for a strip layer between breaker and ply of the present invention includes preferably N,N'-dicyclohexyl-2-benzothiazolylsulfenamide as a vulcanization accelerator.

As the vulcanization accelerator, those such as N-tert-butyl-2-benzothiazolylsulfenamide, N-cyclohexyl-2-benzothiazolylsulfenamide and N,N'-diphenylguanidine are additionally mentioned, but N,N'-dicyclohexyl-2-benzothiazolylsulfenamide is preferable because cord adhesion and reversion property are superior.

The content of N,N'-dicyclohexyl-2-benzothiazolylsulfenamide is preferably 0.5 to 1.5 parts by mass, based on 100 parts by mass of the rubber component, and more preferably 0.7 to 1.3 parts by mass because adhesion with steel cord is superior.

The rubber composition used for a strip layer between breaker and ply is produced by a general method. Namely, the rubber composition for a strip layer between breaker and ply of the present invention can be produced by kneading the rubber components and other compounding agents if necessary, with a Banbury mixer, a kneader and an open roll and then carrying out vulcanization.

The rubber composition for a strip layer between breaker and ply is used as a strip layer between breaker and ply among tire members because it can improve separation resistance performance and can particularly improve the cord adhesion of adjacent breaker and ply at use for a long time.

The thickness of the strip layer between breaker and ply is at least 0.3 mm, preferably at least 0.4 mm and more preferably at least 0.5 mm because the elongation at break of compounding itself is kept. Further, the thickness of the strip layer between breaker and ply is at most 3.9 mm, preferably at most 3.0 mm and more preferably at most 2.0 mm because heat build-up property is superior.

The tire of the present invention is produced by a usual method using the rubber composition for a strip layer between breaker and ply of the present invention. Namely, the rubber composition of the present invention compounding the compounding agents if necessary is extruded and processed in matching with the form of the strip layer between breaker and ply of a tire at unvulcanization stage and molded on a tire molding machine by a usual method; thereby unvulcanized tire is formed. The unvulcanized tire is heated and pressurized in a vulcanizer to-produce usual tires for an automobile, and heavy loading tires for a truck and a bus.

EXAMPLE

The present invention is illustrated based on Examples, but the present invention is not limited only to Examples.

Various chemicals used in Examples and Comparative Examples are shown below as a whole.

Natural rubber (NR): RSS#3

1,4-High cis BR: BR150B manufactured by Ube Industries Ltd.

Carbon black: LI (N219) ($N_2SA$: 105 $m^2/g$) available from MITSUBISHI CHEMICAL CORPORATION.

Silica: Ultrasil VN3 ($N_2SA$: 175 $m^2/g$) available from Degussa Corporation.

Zinc oxide: GINREI R available from Toho Zinc Co., Ltd.

Cobalt stearate: Cobalt Stearate (including 10% of cobalt element) available from Dainippon Ink And Chemicals, Incorporated.

Stearic acid: KIRI available from NOF Corporation.

Antioxidant 6C: NOCRAC 6C available from OUCHISHINKO CHEMICAL INDUSTRIAL CO., LTD.

Insoluble sulfur: CRYSTEX HSOT 20 (insoluble sulfur including 80% by mass of sulfur and 20% by mass of oil) manufactured by Flexsys Chemicals Sdn Bhd.

Vulcanization accelerator DCBS: NOCCELER DZ-G manufactured by OUCHISHINKO CHEMICAL INDUSTRIAL CO., LTD.

Modified resorcinol resin: SUMIKANOL 620 manufactured by Sumitomo Chemical Co., Ltd (chemical formula is shown below).

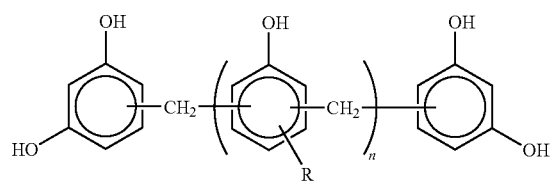

(Wherein R is an octyl group.)

Resorcinol resin: RESORCINOL manufactured by Sumitomo Chemical Co., Ltd (chemical formula is shown below).

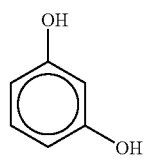

The resorcinol resin is occasionally described as a resorcinol-formalin condensation resin. For example, Penacolite Resin 1319S manufactured by INDSPEC Chemical Corporation (chemical formula is shown below).

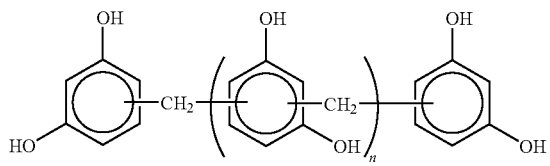

Metacresol resin: Sumikanol 610 manufactured by Sumitomo Chemical Co., Ltd (chemical formula is shown below).

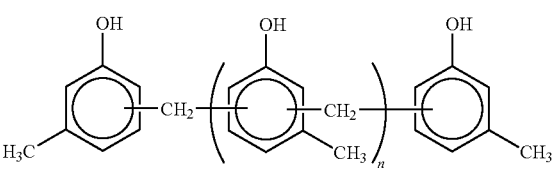

(Wherein n=16 to 17.)

Partial condensate of hexamethylolmelaminepentamethylether (HMMPME): SUMIKANOL 507 manufactured by Sumitomo Chemical Co., Ltd. (It includes silica and 35% by mass of oil. Since its raw material is liquid, it is adsorbed on silica.).

Partial condensate of hexamethoxymethylolmelamine (HMMM): SUMIKANOL 508 manufactured by Sumitomo Chemical Co., Ltd. (It includes silica and 35% by mass of oil.)

Examples 1 to 12 and Comparative Example 1 to 11

Various chemicals excluding sulfur and a vulcanization accelerator among the compounding contents shown in Tables 1 and 2 were kneaded with a Banbury mixer. Sulfur and a vulcanization accelerator were added to the kneaded product obtained, and the mixture was kneaded with an open roll to obtain unvulcanized rubber compositions. The unvulcanized rubber compositions were vulcanized at 150° C. for 30 minutes to prepare test pieces and tests shown below were carried out using the test pieces obtained. Further, unvulcanized rubber compositions were molded in the form of the strip layer between breaker and ply of a tire so as to be gauge (gauge between BrK/Ply) between the strip layer between breaker and ply shown in Tables 1 and 2, laminated with other tire members to form unvulcanized tires and vulcanized by press under condition of 150° C. for 35 min to produce tires (size: 11R22.5) of Examples 1 to 12 and Comparative Examples 1 to 11, and tests shown below were carried out.

<Hardness>

The hardness of the test pieces prepared was measured using a JIS-A hardness meter.

<Tensile Test (Tensile Strength at Break (TB) and Elongation at Break (EB))>

Tensile test was carried out according to JIS K6251 using a No. 3 dumbbell, and tensile strength at break (TB) (MPa) and elongation at break (EB) (%) of the test pieces were measured. The tensile strength at break and elongation at break of the test pieces after thermal oxidation deterioration under condition of a temperature of 80° C. for 96 hours was similarly measured. The larger the value of the tensile strength at break and elongation at break are, the more superior the tensile strength at break and reinforcing property are and the value is indicated as good.

The evaluation results of hardness, tensile strength at break (TB) and elongation at break (EB) are respectively shown in Tables 1 and 2.

<Endurance Test for Reproducing the Separation Between Breaker and Ply>

Endurance test for reproducing the separation between breaker and ply is a test where the separation between breaker and ply is reproduced. The tires were charged in an oven and deteriorated at 80° C. for 3 weeks, and then, running distance until the generation of spreading tread portion was measured when the tires run on a drum at speed of 80 km/h at the condition of 140% loading which was the maximum loading (maximum inner pressure condition) of JIS specification. The measurement value of Example 1 was referred to as 100 and values were respectively displayed by index. The larger the value is, the more superior the durability of tread portion (belt layer) is and the value is indicated as good.

The evaluation results of the drum test for reproducing separation resistance are shown in Tables 1 and 2.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compounding amount (parts by mass) | | | | | | | | | | | | |
| NR | 100 | 100 | 100 | 100 | 100 | 100 | 75 | 100 | 100 | 100 | 100 | 100 |
| 1,4-High cis BR | — | — | — | — | — | — | 25 | — | — | — | — | — |
| Carbon black N219 | 65 | 55 | 65 | 65 | 65 | 65 | 55 | 65 | 65 | 65 | 65 | 65 |
| Silica VN3 | — | 10 | — | — | — | — | 10 | — | — | — | — | — |
| Zinc oxide | 10 | 10 | 10 | 10 | 10 | 10 | 10 | 10 | 10 | 10 | 10 | 10 |
| Cobalt stearate | 1.5 | 1.5 | 1.5 | 1.5 | 1.5 | 1.5 | 1.5 | 1.5 | 1.5 | 1.5 | — | 1.5 |
| Stearic acid | — | — | — | — | — | — | — | — | — | — | 1.5 | — |
| Antioxidant 6C | 1.0 | 1.0 | 1.0 | 1.0 | 1.0 | 1.0 | 1.0 | 1.0 | 1.0 | 1.0 | 1.0 | 1.0 |
| Insoluble sulfur (including 20% of oil) | 3.75 | 3.75 | 3.75 | 3.13 | 4.75 | 3.75 | 3.75 | 3.75 | 3.75 | 3.75 | 3.75 | 3.75 |
| Pure sulfur | (3.0) | (3.0) | (3.0) | (2.5) | (3.8) | (3.0) | (3.0) | (3.0) | (3.0) | (3.0) | (3.0) | (3.0) |
| Vulcanization accelerator DCBS | 1.0 | 1.0 | 0.5 | 1.0 | 1.0 | 1.0 | 1.0 | 1.0 | 1.0 | 1.0 | 1.0 | 1.0 |
| Modified resorcinol resin | 1.5 | 1.5 | 2.0 | 2.0 | 1.0 | 1.5 | 1.5 | 1.5 | 1.5 | — | 1.5 | — |
| Resorsinol resin | — | — | — | — | — | — | — | — | — | 1.5 | — | — |
| Metacresol resin | — | — | — | — | — | — | — | — | — | — | — | 1.5 |
| HMMPME | 2.0 | 2.0 | 3.0 | 3.0 | 1.5 | — | 2.0 | 2.0 | 2.0 | 2.0 | 2.0 | 2.0 |
| HMMM | — | — | — | — | — | 2.0 | — | — | — | — | — | — |
| Gauge between BrK/ply | 1.0 | 1.0 | 1.0 | 1.0 | 1.0 | 1.0 | 1.0 | 0.5 | 2.0 | 1.0 | 1.0 | 1.0 |
| Evaluation result | | | | | | | | | | | | |
| Hardness | 74 | 75 | 76 | 74 | 74 | 74 | 75 | 74 | 74 | 76 | 75 | 75 |
| Tensile strength at break (TB) (MPa) | 25 | 26 | 25 | 24 | 24 | 26 | 22 | 25 | 25 | 24 | 24 | 26 |
| After thermal oxidation deterioration | 22 | 24 | 22 | 23 | 21 | 23 | 20 | 22 | 22 | 21 | 20 | 24 |
| Elongation at break (EB) (%) | 400 | 440 | 380 | 350 | 420 | 390 | 360 | 400 | 400 | 380 | 390 | 460 |
| After thermal oxidation deterioration | 360 | 380 | 340 | 330 | 340 | 360 | 290 | 360 | 360 | 320 | 360 | 370 |
| Endurance test for reproducing the separation between breaker and ply | 100 | 115 | 95 | 85 | 85 | 100 | 80 | 70 | 125 | 85 | 95 | 105 |

TABLE 2

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Compounding amount (parts by mass) | | | | | | | | | | | |
| NR | 100 | 100 | 100 | 100 | 100 | 100 | 100 | 100 | 100 | 100 | 100 |
| 1,4-High cis BR | — | — | — | — | — | — | — | — | — | — | — |
| Carbon black N219 | 65 | 65 | 65 | 65 | 65 | 65 | 55 | 65 | 65 | 65 | 65 |
| Silica VN3 | — | — | — | — | — | — | 10 | — | — | — | — |
| Zinc oxide | 10 | 10 | 10 | 10 | 10 | 10 | 10 | 10 | 10 | 10 | 10 |
| Cobalt stearate | 1.5 | 1.5 | 1.5 | 1.5 | 1.5 | 1.5 | 1.5 | 1.5 | 1.5 | 1.5 | 1.5 |
| Antioxidant 6C | 1.0 | 1.0 | 1.0 | 1.0 | 1.0 | 1.0 | 1.0 | 1.0 | 1.0 | 1.0 | 1.0 |
| Insoluble sulfur (including 20% of oil) | 5.63 | 1.88 | 1.88 | 3.75 | 3.75 | 3.75 | 5.63 | 1.88 | 3.75 | 3.75 | 5.63 |
| Pure sulfur | (4.5) | (1.5) | (1.5) | (3.0) | (3.0) | (3.0) | (4.5) | (1.5) | (3.0) | (3.0) | (4.5) |

TABLE 2-continued

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Vulcanization accelerator DCBS | 1.0 | 1.0 | 1.0 | 1.0 | 1.0 | 1.0 | 1.0 | 1.0 | 1.0 | 1.0 | 1.0 |
| Modified resorcinol resin | 1.5 | 1.5 | 2.0 | 5 | 1.5 | 0.4 | 1.5 | 4.0 | 1.5 | 1.5 | 1.5 |
| HMMPME | 2.0 | 2.0 | 3.0 | 2.0 | 4 | 2.0 | 2.0 | 3.0 | 2.0 | 2.0 | 2.0 |
| HMMM | — | — | — | — | — | — | — | — | — | — | — |
| Gauge between BrK/ply | 1.0 | 1.0 | 1.0 | 1.0 | 1.0 | 1.0 | 1.0 | 1.0 | 4.0 | 0 | 4.0 |
| Evaluation result | | | | | | | | | | | |
| Hardness | 77 | 68 | 72 | 81 | 79 | 72 | 77 | 74 | 74 | — | 77 |
| Tensile strength at break (TB) (MPa) | 24 | 21 | 22 | 24 | 25 | 19 | 25 | 21 | 25 | — | 24 |
| After thermal oxidation deterioration | 18 | 19 | 19 | 20 | 21 | 16 | 19 | 19 | 22 | — | 18 |
| Elongation at break (EB) (%) | 420 | 330 | 320 | 330 | 280 | 390 | 440 | 280 | 400 | — | 420 |
| After thermal oxidation deterioration | 270 | 270 | 280 | 260 | 190 | 320 | 290 | 200 | 360 | — | 270 |
| Endurance test for reproducing the separation between breaker and ply | 65 | 70 | 75 | 70 | 50 | 65 | 75 | 70 | 80 | 40 | 45 |

According to the present invention, tensile strength at break and elongation at break can be improved, the lowering rate of fracture property after thermal aging can be lessened and separation resistance property is excellent, by using a rubber composition including the specific amounts of sulfur, a cresol resin, a modified cresol resin, resorcinol or a modified resorcinol condensate and the partial condensate of hexamethylolmelaminepentamethylether or the partial condensate of hexamethoxymethylolmelamine in the rubber component, for the strip layer between breaker and ply.

What is claimed is:

1. A tire having a strip layer between a breaker and a ply, and using a rubber composition for the strip layer between the breaker and the ply, the rubber composition comprising:
   2.0 to 3.0 parts by mass of sulfur;
   0.5 to 4 parts by mass of a cresol resin, a modified cresol resin, resorcinol or a modified resorcinol condensate;
   0.3 to 3 parts by mass of a partial condensate of hexamethylolmelaminepentamethylether or a partial condensate of hexamethoxymethylolmelamine, based on 100 parts by mass of a diene rubber component; and
   5 to 20 parts by mass of silica having a nitrogen adsorption specific surface area of 100 to 190 $m^2/g$,
   wherein the thickness of the strip layer between breaker and ply is 0.3 to 3.9 mm, and
   wherein the breaker in a tire widthwise direction is wider than the strip layer.

2. The tire of claim 1, further comprising a cobalt salt of organic acid, wherein the content of the cobalt is 0.05 to 0.8 parts by mass based on 100 parts by mass of the rubber component.

3. The tire of claim 1, further comprising a sidewall provided at an outside of the ply, wherein a widthwise end of the sidewall joins a widthwise end of the strip layer.

* * * * *